US012445484B2

(12) United States Patent
Zhang et al.

(10) Patent No.: US 12,445,484 B2
(45) Date of Patent: Oct. 14, 2025

(54) INLINE RANSOMWARE DETECTION VIA SERVER MESSAGE BLOCK (SMB) TRAFFIC

(71) Applicant: Palo Alto Networks, Inc., Santa Clara, CA (US)

(72) Inventors: Zhibin Zhang, Santa Clara, CA (US); Mengying Jiang, Campbell, CA (US); Bo Qu, Saratoga, CA (US); Sultanbek Omurzakov, Los Gatos, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 18/128,789

(22) Filed: Mar. 30, 2023

(65) Prior Publication Data

US 2024/0333759 A1 Oct. 3, 2024

(51) Int. Cl.
*H04L 9/00* (2022.01)
*H04L 9/40* (2022.01)

(52) U.S. Cl.
CPC ...... *H04L 63/1466* (2013.01); *H04L 63/1416* (2013.01); *H04L 63/1425* (2013.01); *H04L 63/20* (2013.01)

(58) Field of Classification Search
CPC ............. H04L 63/1466; H04L 63/1416; H04L 63/1425
USPC ............................................................ 726/1
See application file for complete search history.

(56) References Cited

U.S. PATENT DOCUMENTS

| 10,469,525 | B2 * | 11/2019 | Hittel | G06F 21/552 |
|---|---|---|---|---|
| 10,554,688 | B1 * | 2/2020 | Wueest | H04L 63/1416 |
| 10,628,585 | B2 * | 4/2020 | Tamir | G06F 16/128 |
| 11,349,855 | B1 * | 5/2022 | Amit | G06F 9/547 |
| 11,374,964 | B1 * | 6/2022 | Agrawal | H04L 63/20 |
| 2018/0351969 | A1 * | 12/2018 | MacLeod | G06F 11/2038 |
| 2019/0102533 | A1 * | 4/2019 | Sagar | G06F 21/85 |
| 2021/0152595 | A1 * | 5/2021 | Hansen | G06F 21/568 |
| 2022/0060498 | A1 * | 2/2022 | Head, Jr. | H04L 12/4641 |
| 2022/0231991 | A1 * | 7/2022 | Blum Shem-Tov | H04L 63/0435 |
| 2022/0329442 | A1 * | 10/2022 | Bulusu | H04L 63/1416 |
| 2023/0007023 | A1 * | 1/2023 | Andrabi | G06N 3/08 |

OTHER PUBLICATIONS

Lemmou et al., In-Depth Analysis of Ransom Note Files, Computers, 2021, https://doi.org/10.3390/ computers 10110145.

* cited by examiner

*Primary Examiner* — Christopher J Brown
(74) *Attorney, Agent, or Firm* — Van Pelt, Yi & James LLP

(57) ABSTRACT

Inline detection of ransomware attacks using network traffic, such as server message block (SMB) traffic, is disclosed. A network communication between a client and a server is received. A determination is made, using the received network traffic, that a ransomware attack is being attempted against the server. In response to detecting the attempted ransomware attack, a remedial action is performed.

17 Claims, 9 Drawing Sheets

| | | | | | |
|---|---|---|---|---|---|
| 159 | 2022-03-22 | 00:47:38.742180 | 192... | 192.168... | SMB2 | 182 Close Response |
| 160 | 2022-03-22 | 00:47:38.743440 | 192... | 192.168... | SMB2 | 386 Create Request File: How To Restore Your Files.txt ← 402 |
| 161 | 2022-03-22 | 00:47:38.744443 | 192... | 192.168... | SMB2 | 354 Create Response File: How To Restore Your Files.txt ← 404 |
| 162 | 2022-03-22 | 00:47:38.744581 | 192... | 192.168... | SMB2 | 131 Notify Response, Error: STATUS_NOTIFY_ENUM_DIR |
| 164 | 2022-03-22 | 00:47:38.746269 | 192... | 192.168... | SMB2 | 154 Notify Request File: |
| 165 | 2022-03-22 | 00:47:38.746643 | 192... | 192.168... | SMB2 | 131 Notify Response, Error: STATUS_NOTIFY_ENUM_DIR |
| 166 | 2022-03-22 | 00:47:38.750119 | 192... | 192.168... | SMB2 | 1514 Write Request Len: 1677 Off:0 File: How To Restore Your Files.txt ← 406 |
| 169 | 2022-03-22 | 00:47:38.751229 | 192... | 192.168... | SMB2 | 138 Write Response |
| 170 | 2022-03-22 | 00:47:38.751805 | 192... | 192.168... | SMB2 | 146 Close Request File: How To Restore Your Files.txt ← 408 |
| 171 | 2022-03-22 | 00:47:38.752180 | 192... | 192.168... | SMB2 | 182 Close Response |
| 173 | 2022-03-22 | 00:47:39.120369 | 192... | 192.168... | SMB2 | 346 Create Request File: desktop.ini |
| 174 | 2022-03-22 | 00:47:39.120936 | 192... | 192.168... | SMB2 | 131 Create Response, Error: STATUS_OBJECT_NAME_NOT_FOUND |
| 175 | 2022-03-22 | 00:47:39.121246 | 192... | 192.168... | SMB2 | 306 Create Request File: |
| 176 | 2022-03-22 | 00:47:39.121744 | 192... | 192.168... | SMB2 | 242 Create Response File: |
| 177 | 2022-03-22 | 00:47:39.122287 | 192... | 192.168... | SMB2 | 260 Find Request File: SMB2_FIND_ID_BOTH_DIRECTORY_INFO Pattern: *; Finc |
| 178 | 2022-03-22 | 00:47:39.122623 | 192... | 192.168... | SMB2 | 730 Find Response; Find Response, Error: STATUS_NO_MORE_FILES |
| 179 | 2022-03-22 | 00:47:39.184901 | 192... | 192.168... | SMB2 | 275 GetInfo Request FS_INFO/FileFsVolumeInformation File: ;GetInfo Reque |
| 180 | 2022-03-22 | 00:47:39.185320 | 192... | 192.168... | SMB2 | 266 GetInfo Response; GetInfo Response |
| 181 | 2022-03-22 | 00:47:39.185602 | 192... | 192.168... | SMB2 | 162 GetInfo Request FS_INFO/FileFsFullSizeInformation File: |
| 182 | 2022-03-22 | 00:47:39.185893 | 192... | 192.168... | SMB2 | 162 GetInfo Response |
| 183 | 2022-03-22 | 00:47:39.186435 | 192... | 192.168... | SMB2 | 162 GetInfo Request FS_INFO/FileFsFullSizeInformation File: |
| 184 | 2022-03-22 | 00:47:39.186730 | 192... | 192.168... | SMB2 | 162 GetInfo Response |
| 185 | 2022-03-22 | 00:47:39.206005 | 192... | 192.168... | SMB2 | 146 Close Request File: |
| 186 | 2022-03-22 | 00:47:39.206412 | 192... | 192.168... | SMB2 | 182 Close Response |
| 187 | 2022-03-22 | 00:47:39.257310 | 192... | 192.168... | SMB2 | 174 Tree Connect Request Tree: \\192.168.119.128\IPC$ |

FIG. 4

| | | | | | |
|---|---|---|---|---|---|
| 204 | 2022-03-22 | 00:47:39.642959 | 192... | 192.168... | SMB2 | 194 SetInfo Request FILE_INFO/SMB2_FILE_BASIC_INFO File: BiteMe.txt |
| 205 | 2022-03-22 | 00:47:39.643209 | 192... | 192.168... | SMB2 | 124 SetInfo Response |
| 206 | 2022-03-22 | 00:47:39.643394 | 192... | 192.168... | SMB2 | 146 Close Request File: BiteMe.txt |
| 207 | 2022-03-22 | 00:47:39.643592 | 192... | 192.168... | SMB2 | 182 Close Response |
| 208 | 2022-03-22 | 00:47:39.643862 | 192... | 192.168... | SMB2 | 346 Create Request File: BiteMe.txt |
| 209 | 2022-03-22 | 00:47:39.644295 | 192... | 192.168... | SMB2 | 354 Create Response File: BiteMe.txt |
| 210 | 2022-03-22 | 00:47:39.644590 | 192... | 192.168... | SMB2 | 162 SetInfo Request FILE_INFO/SMB2_FILE_ENDOFFILE_INFO File: BiteMe.txt |
| 211 | 2022-03-22 | 00:47:39.645083 | 192... | 192.168... | SMB2 | 124 SetInfo Response ~502 |
| 212 | 2022-03-22 | 00:47:39.649952 | 192... | 192.168... | SMB2 | 171 Read Request Len:108 Off:0 File: BiteMe.txt ~504 |
| 213 | 2022-03-22 | 00:47:39.650436 | 192... | 192.168... | SMB2 | 246 Read Response |
| 214 | 2022-03-22 | 00:47:39.650720 | 192... | 192.168... | SMB2 | 278 Write Request Len:108 Off:0 File: BiteMe.txt |
| 215 | 2022-03-22 | 00:47:39.651354 | 192... | 192.168... | SMB2 | 138 Write Response |
| 216 | 2022-03-22 | 00:47:39.651609 | 192... | 192.168... | SMB2 | 146 Flush Request File: BiteMe.txt |
| 217 | 2022-03-22 | 00:47:39.652990 | 192... | 192.168... | SMB2 | 126 Flush Response |
| 218 | 2022-03-22 | 00:47:39.653253 | 192... | 192.168... | SMB2 | 146 Close Request File: BiteMe.txt |
| 219 | 2022-03-22 | 00:47:39.653525 | 192... | 192.168... | SMB2 | 182 Close Response |
| 220 | 2022-03-22 | 00:47:39.653938 | 192... | 192.168... | SMB2 | 322 Create Request File: BiteMe.txt |
| 221 | 2022-03-22 | 00:47:39.654480 | 192... | 192.168... | SMB2 | 298 Create Response File: BiteMe.txt |
| 222 | 2022-03-22 | 00:47:39.655217 | 192... | 192.168... | SMB2 | 210 SetInfo Request FILE_INFO/SMB2_FILE_RENAME_INFO File: BiteMe.txt NewName: BiteMe.txt.babyk ~506 |
| 223 | 2022-03-22 | 00:47:39.655759 | 192... | 192.168... | SMB2 | 124 SetInfo Response |
| 224 | 2022-03-22 | 00:47:39.656130 | 192... | 192.168... | SMB2 | 162 GetInfo Request FILE_INFO/SMB2_FILE_NETWORK_OPEN_INFO File: BiteMe.txt |
| 225 | 2022-03-22 | 00:47:39.656349 | 192... | 192.168... | SMB2 | 186 GetInfo Response |

FIG. 5

```
import smb_parser
import shannon_entropy
import config
from file_parser import file_type_mismatch class SMB_Ransomware_Detection:
    def __init__(self):
        # it stores the SMB session info
        # for example what operations happened
        self.sessions = {} entry point
    def is_ransomware_encryption(self, smb_packet):
        # smb_parser is able to parse smb1 and smb2
        smb_operation = smb_parser.parse(smb_packet)

if smb_operation.command == SMB_RENAME:
            smb_rename = SMB_RENAME(smb_operation)

# the rename operation is only appending a new file extension
            # so two file extensions are found
            if smb_rename.new_name.startswith(smb_rename.old_name) and \
                    smb_rename.new_name.count(b'.') >= 2:
                added = smb_rename.new_name[len(smb_rename.old_name):]
                if added.startswith(b'.') and added.count(b'.') == 1:
                    # check if the new file extension in allow list
                    if added not in config.allowed_file_extension:
                        # get the file content in the previous write operation
                        # we don't need to store the whole file, 1-2 packets of data is enough
                        file_write_operation = self.sessions[smb_operation.session_id].get_last_write_operation()

if file_write_operation is not None:
                            # get all the file extensions
                            file_extensions = [b'.' + extension for extension in smb_rename.new_name.split('.')[1:]]
                            # check if file extension & file type not match
                            # also calculate file entropy
                            if file_type_mismatch(file_extensions, file_write_operation.get_file_content()) and \
                                    shannon_entropy(file_write_operation.get_file_content()) > config.entropy_threshold:
                                # all conditions matched, it is a ransomware encryption behavior
                                return True return False
```

FIG. 8

INLINE RANSOMWARE DETECTION VIA SERVER MESSAGE BLOCK (SMB) TRAFFIC

BACKGROUND OF THE INVENTION

Malware is a general term commonly used to refer to malicious software (e.g., including a variety of hostile, intrusive, and/or otherwise unwanted software). Example uses of malware include disrupting computer and/or computer network operations, stealing proprietary information (e.g., confidential information, such as identity, financial, and/or intellectual property related information through phishing or other techniques), and/or gaining access to private/proprietary computer systems and/or computer networks. Malware can be in the form of code, scripts, documents, active content, and/or other software. Unfortunately, as techniques are developed to help detect and mitigate malware, nefarious authors find ways to circumvent such efforts. Accordingly, there is an ongoing need for improvements to techniques for identifying and mitigating malware.

BRIEF DESCRIPTION OF THE DRAWINGS

Various embodiments of the invention are disclosed in the following detailed description and the accompanying drawings.

FIG. 4 illustrates example server log lines.

FIG. 5 illustrates example server log lines.

FIG. 8 illustrates an example of python code for helping to detect a ransomware attack.

DETAILED DESCRIPTION

Figure 1:
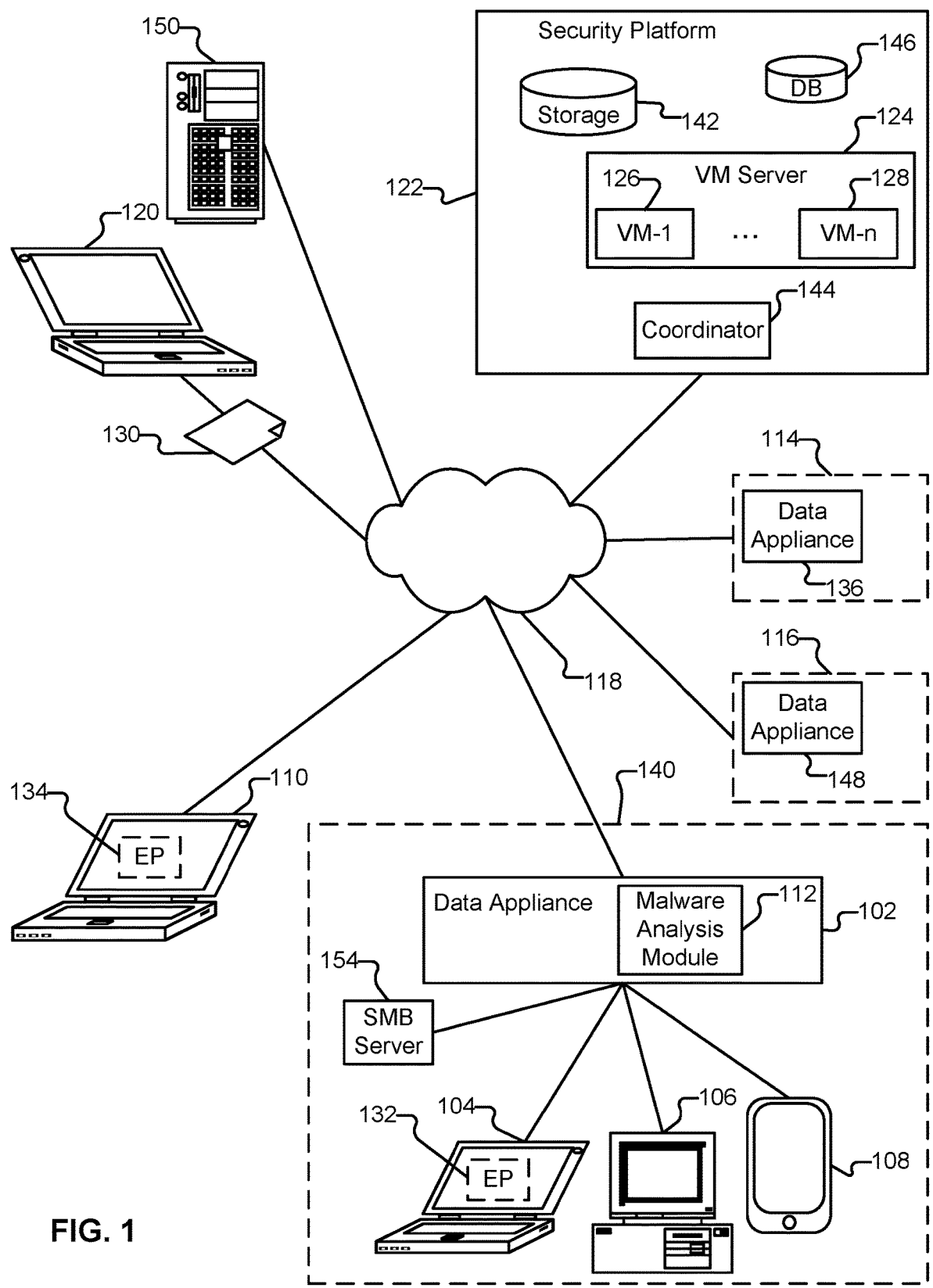
FIG. 1 illustrates an example of an environment in which malicious applications are detected and prevented from causing harm.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. Overview

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QOS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provides higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

II. Example Environment

FIG. 1 illustrates an example of an environment in which malicious applications ("malware") are detected and prevented from causing harm. As will be described in more detail below, malware classifications (e.g., as determined by security platform 122) can be variously shared and/or refined among various entities included in the environment shown in FIG. 1. And, using techniques described herein, devices, such as endpoint client devices 104-110 can be protected from such malware.

The term "application" is used throughout the Specification to collectively refer to programs, bundles of programs, manifests, packages, etc., irrespective of form/platform. An "application" (also referred to herein as a "sample") can be a standalone file (e.g., a calculator application having the filename "calculator.apk" or "calculator.exe") and can also be an independent component of another application (e.g., a mobile advertisement SDK or library embedded within the calculator app).

"Malware" as used herein refers to an application that engages in behaviors, whether clandestinely or not (and whether illegal or not), of which a user does not approve/would not approve if fully informed. Examples of malware include Trojans, viruses, rootkits, spyware, hacking tools, keyloggers, etc. One example of malware is a desktop application that collects and reports to a remote server the end user's location (but does not provide the user with location-based services, such as a mapping service). Another example of malware is a malicious Android Application Package .apk (APK) file that appears to an end user to be a free game, but stealthily sends SMS premium messages (e.g., costing $10 each), running up the end user's phone bill. Another example of malware is an Apple IOS flashlight application that stealthily collects the user's contacts and sends those contacts to a spammer. Other forms of malware can also be detected/thwarted using the techniques described herein (e.g., ransomware). Further, while various information is described herein as being generated for malicious applications, techniques described herein can also be used in various embodiments to generate profiles for other kinds of applications (e.g., adware profiles, goodware profiles, etc.).

Techniques described herein can be used in conjunction with a variety of platforms (e.g., desktops, mobile devices, gaming platforms, embedded systems, etc.) and/or a variety of types of applications (e.g., Android apk files, iOS applications, Windows PE files, Adobe Acrobat PDF files, etc.). In the example environment shown in FIG. 1, client devices 104-108 are a laptop computer, a desktop computer, and a tablet (respectively) present in an enterprise network 140. Client device 110 is a laptop computer present outside of enterprise network 140 (belonging to the "ACME Company").

Data appliance 102 is configured to enforce policies regarding communications between clients, such as client devices 104 and 106, and nodes outside of enterprise network 140 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within enterprise network 140.

Although illustrated as a single element in FIG. 1, enterprise network 140 can comprise multiple networks, any/each of which can include one or multiple data appliances or other components that embody techniques described herein. For example, the techniques described herein can be deployed by large, multi-national companies (or other entities) with multiple offices in multiple geographical locations. And, while client devices 104-108 are illustrated in FIG. 1 as connecting directly to data appliance 102, it is to be understood that one or more intermediate nodes (e.g., routers, switches, and/or proxies) can be and typically are interposed between various elements in enterprise network 140.

Figure 2A:
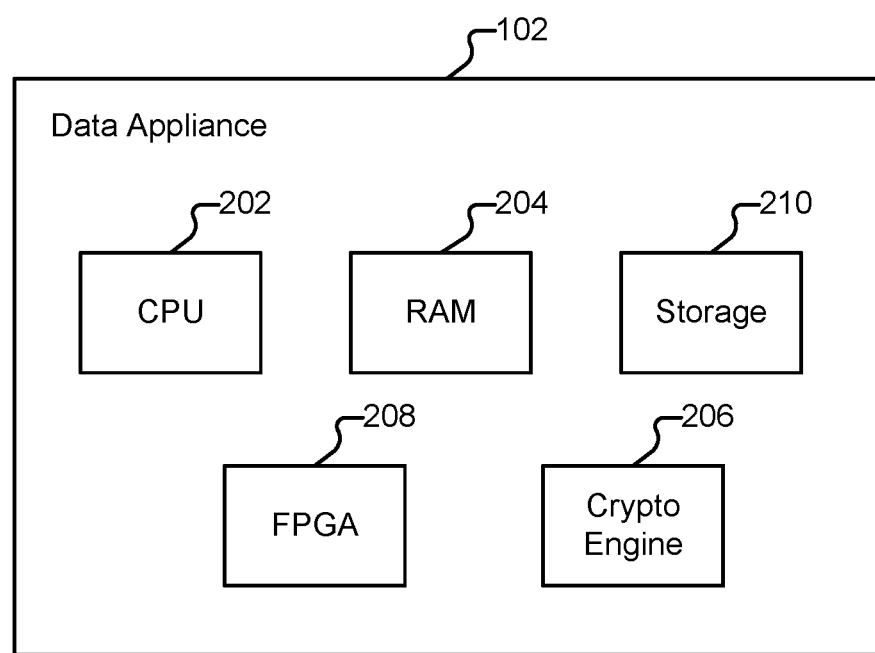
FIG. 2A illustrates an embodiment of a data appliance.

An embodiment of a data appliance is shown in FIG. 2A. The example shown is a representation of physical components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disks or solid state storage units). In various embodiments, data appliance 102 stores (whether in RAM 204, storage 210, and/or other appropriate locations) information used in monitoring enterprise network 140 and implementing disclosed techniques. Examples of such information include application identifiers, content identifiers, user identifiers, requested URLs, IP address mappings, policy and other configuration information, signatures, hostname/URL categorization information, malware profiles, and machine learning models. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general purpose computer, a computer server, a gateway, and/or a network/routing device. In some embodiments, at least some services described as being provided by data appliance 102 are instead (or in addition) provided to a client device (e.g., client device 104 or client device 110) by software executing on the client device (e.g., endpoint protection application 132).

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on.

Figure 2B:
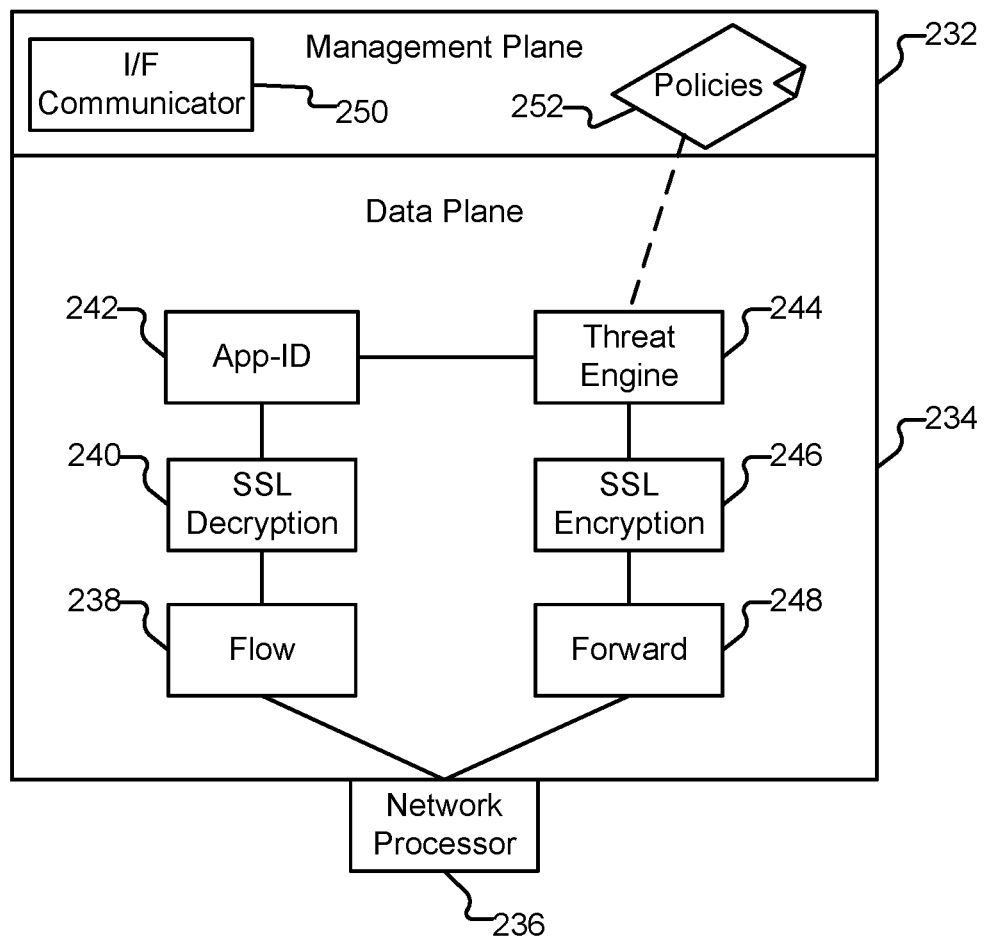
FIG. 2B is a functional diagram of logical components of an embodiment of a data appliance.

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 140. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, e.g., a web browsing session, the identified application can change, and such changes will be noted by data appliance 102. For example, a user may initially browse to a corporate Wiki (classified based on the URL visited as "Web Browsing-Productivity") and then subsequently browse to a social networking site (classified based on the URL visited as "Web Browsing-Social Networking"). Different types of protocols have corresponding decoders.

Based on the determination made by application identification engine 242, the packets are sent to an appropriate decoder. Threat engine 244 is configured to assemble packets (which may be received out of order) into the correct order, perform tokenization, and extract out information. Threat engine 244 also performs signature matching to determine what should happen to the packet. As needed, SSL encryption engine 246 can re-encrypt decrypted data.

Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 250 is provided for management communications (e.g., via (REST) APIs, messages, or network protocol communications or other communication mechanisms).

III. Security Platform

Returning to FIG. 1, in various embodiments, security platform 122 is configured to provide a variety of services (including to data appliance 102), including analyzing samples (e.g., of documents, applications, etc.) for maliciousness, categorizing applications, categorizing domains/URLs/URIs, etc.

Suppose a malicious individual (using system 120) has created malware 130. The malicious individual hopes that a client device, such as client device 104, will execute a copy of malware 130, compromising the client device, and causing the client device to become a bot in a botnet. The compromised client device can then be instructed to perform tasks (e.g., cryptocurrency mining, or participating in denial of service attacks) and to report information to an external entity, such as command and control (C&C) server 150, as well as to receive instructions from C&C server 150, as applicable.

Suppose data appliance 102 has intercepted an email sent (e.g., by system 120) to a user, "Alice," who operates client device 104 as an employee of ACME Corporation (who maintains enterprise network 140). A copy of malware 130 has been attached by system 120 to the message. As an alternate, but similar scenario, data appliance 102 could intercept an attempted download by client device 104 of malware 130 (e.g., from a website). In either scenario, data appliance 102 determines whether a signature for the file (e.g., the email attachment or website download of malware 130) is present on data appliance 102. A signature, if present, can indicate that a file is known to be safe (e.g., is whitelisted), and can also indicate that the file is known to be malicious (e.g., is blacklisted).

In various embodiments, data appliance 102 is configured to work in cooperation with a security platform (e.g., security platform 122). As one example, security platform 122 can provide to data appliance 102 a set of signatures of known-malicious files (e.g., as part of a subscription). If a signature for malware 130 (e.g., an MD5 hash of malware 130) is included in the set of signatures, data appliance 102 can prevent the transmission of malware 130 to client device 104 accordingly (e.g., by detecting that an MD5 hash of the email attachment sent to client device 104 matches the MD5 hash of malware 130). Security platform 122 can also provide to data appliance 102 a list of known malicious domains and/or IP addresses, allowing data appliance 102 to block traffic between enterprise network 140 and C&C server 150 (e.g., where C&C server 150 is known to be malicious). The list of malicious domains (and/or IP addresses) can also help data appliance 102 determine when one of its nodes has been compromised. For example, if client device 104 attempts to contact C&C server 150, such attempt is a strong indicator that client 104 has been compromised by malware (and remedial actions should be taken accordingly, such as quarantining client device 104 from communicating with other nodes within enterprise network 140). Security platform 122 can also provide other types of information to data appliance 102 (e.g., as part of a subscription) such as a set of machine learning models usable by data appliance 102 to perform inline analysis of files.

A variety of actions can be taken by data appliance 102 if no signature for an attachment is found, in various embodiments. As a first example, data appliance 102 can fail-safe, by blocking transmission of any attachments not whitelisted as benign (e.g., not matching signatures of known good files). A potential drawback of this approach is that there may be many legitimate attachments unnecessarily blocked as potential malware when they are in fact benign. As a second example, data appliance 102 can fail-danger, by allowing transmission of any attachments not blacklisted as malicious (e.g., not matching signatures of known bad files). A potential drawback of this approach is that newly created malware (previously unseen by security platform 122) will not be prevented from causing harm. As a third example, data appliance 102 can be configured to provide the file (e.g., malware 130) to security platform 122 for static/dynamic analysis, to determine whether it is malicious and/or to otherwise classify it. A variety of actions can be taken by data appliance 102 while analysis by security platform 122 of the attachment (for which a signature is not already present) is performed. As a first example, data appliance 102 can prevent the email (and attachment) from being delivered to Alice until a response is received from security platform 122. Assuming security platform 122 takes approximately 15 minutes to thoroughly analyze a sample, this means that the incoming message to Alice will be delayed by 15 minutes. Since, in this example, the attachment is malicious, such a delay will not impact Alice negatively. In an alternate example, suppose someone has sent Alice a time sensitive message with a benign attachment for which a signature is also not present. Delaying delivery of the message to Alice by 15 minutes will likely be viewed (e.g., by Alice) as unacceptable. As will be described in more detail below, an alternate approach is to perform at least some real-time analysis on the attachment on data appliance 102 (e.g., while awaiting a verdict from security platform 122). If data appliance 102 can independently determine whether the attachment is malicious or benign, it can take an initial action (e.g., block or allow delivery to Alice), and can adjust/take additional actions once a verdict is received from security platform 122, as applicable.

Security platform 122 stores copies of received samples in storage 142 and analysis is commenced (or scheduled, as applicable). One example of storage 142 is an Apache Hadoop Cluster (HDFS). Results of analysis (and additional information pertaining to the applications) are stored in database 146. In the event an application is determined to be malicious, data appliances can be configured to automatically block the file download based on the analysis result. Further, a signature can be generated for the malware and distributed (e.g., to data appliances such as data appliances 102, 136, and 148) to automatically block future file transfer requests to download the file determined to be malicious.

In various embodiments, security platform 122 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 122 can be implemented across a scalable infrastructure comprising multiple such servers, solid state drives, and/or other applicable high-performance hardware. Security platform 122 can comprise several distributed components, including components provided by one or more third parties. For example, portions or all of security platform 122 can be implemented using the Amazon Elastic Compute Cloud (EC2) and/or Amazon Simple Storage Service (S3). Further, as with data appliance 102, whenever security platform 122 is referred to as performing a task, such as storing data or processing data, it is to be understood that a sub-component or multiple sub-components of security platform 122 (whether individually or in cooperation with third party components) may cooperate to perform that task. As one example, security platform 122 can optionally perform static/dynamic analysis in cooperation with one or more virtual machine (VM) servers, such as VM server 124.

An example of a virtual machine server is a physical machine comprising commercially available server-class hardware (e.g., a multi-core processor, 32+ Gigabytes of RAM, and one or more Gigabit network interface adapters) that runs open source and/or commercially available virtualization software, such as Linux Kernel based Virtual Machine (KVM), VMware ESXi, Citrix XenServer, and/or Microsoft Hyper-V. In some embodiments, the virtual machine server is omitted. Further, a virtual machine server may be under the control of the same entity that administers security platform 122, but may also be provided by a third party. As one example, the virtual machine server can rely on EC2, with the remainder portions of security platform 122 provided by dedicated hardware owned by and under the control of the operator of security platform 122. VM server 124 is configured to provide one or more virtual machines 126-128 for emulating client devices. The virtual machines can execute a variety of operating systems and/or versions thereof. Observed behaviors resulting from executing applications in the virtual machines are logged and analyzed (e.g., for indications that the application is malicious). In some embodiments, log analysis is performed by the VM server (e.g., VM server 124). In other embodiments, analysis is performed at least in part by other components of security platform 122, such as a coordinator 144.

In various embodiments, security platform 122 makes available the results of its analysis of samples via a list of signatures (and/or other identifiers) to data appliance 102 as part of a subscription. For example, security platform 122 can periodically send a content package that identifies malware apps (e.g., daily, hourly, or some other interval, and/or based on an event configured by one or more policies). An example content package includes a listing of identified malware apps, with information such as a package name, a hash value for uniquely identifying the app, and a malware name (and/or malware family name) for each identified malware app. The subscription can cover the analysis of just those files intercepted by data appliance 102 and sent to security platform 122 by data appliance 102, and can also cover signatures of all malware known to security platform 122 (or subsets thereof, such as just mobile malware but not other forms of malware (e.g., PDF malware)). Security platform 122 can also make available other types of information, such as machine learning models that can help data appliance 102 detect malware (e.g., through techniques other than hash-based signature matching).

In various embodiments, security platform 122 is configured to provide security services to a variety of entities in addition to (or, as applicable, instead of) an operator of data appliance 102. For example, other enterprises, having their own respective enterprise networks 114 and 116, and their own respective data appliances 136 and 148, can contract with the operator of security platform 122. Other types of entities can also make use of the services of security platform 122. For example, an Internet Service Provider (ISP) providing Internet service to client device 110 can contract with security platform 122 to analyze applications which client device 110 attempts to download. As another example, the owner of client device 110 can install endpoint protection software 134 on client device 110 that communicates with security platform 122 (e.g., to receive content packages from security platform 122, use the received content packages to check attachments in accordance with techniques described herein, and transmit applications to security platform 122 for analysis).

In various embodiments, security platform 122 is configured to collaborate with one or more third party services. As one example, security platform 122 can provide malware scanning results (and other information, as applicable) to a third-party scanner service (e.g., VirusTotal). Security platform 122 can similarly incorporate information obtained from a third-party scanner service (e.g., maliciousness verdicts from entities other than security platform 122) into its own information (e.g., information stored in database 146 or another appropriate repository of information).

IV. Analyzing Samples Using Static/Dynamic Analysis

Figure 3:
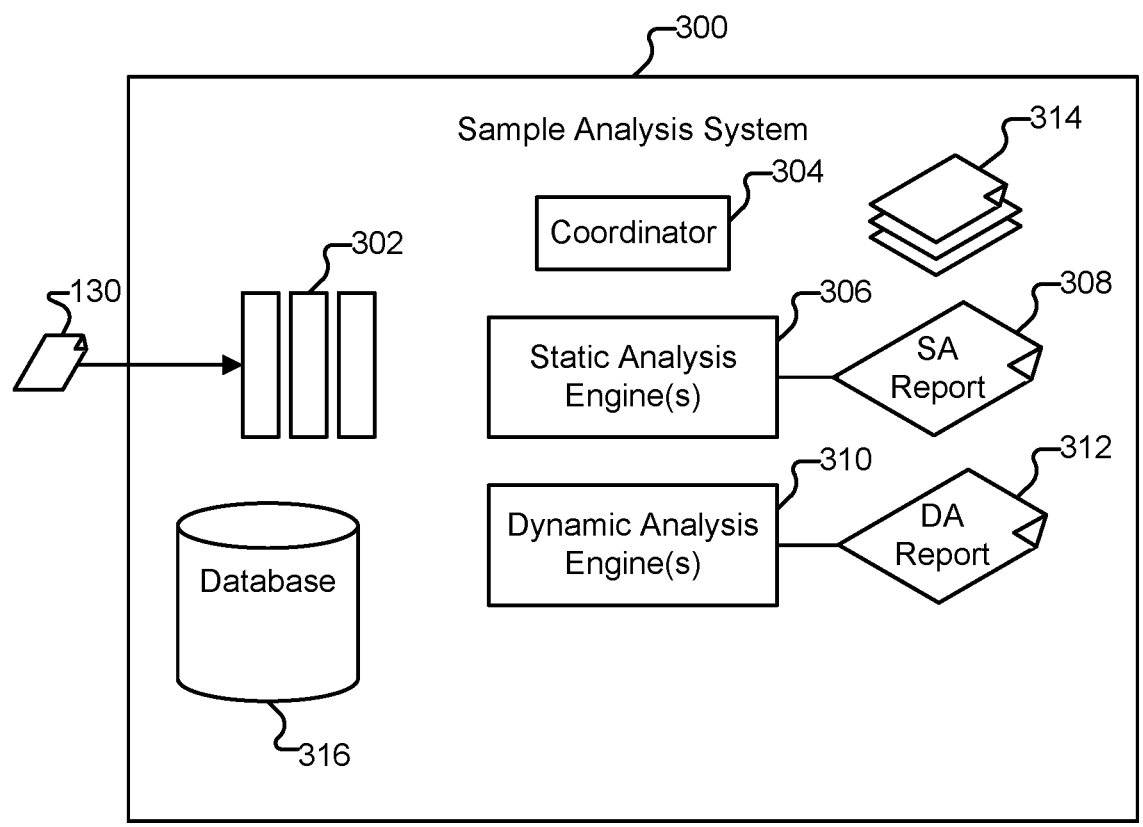
FIG. 3 illustrates an example of logical components that can be included in a system for analyzing samples.

FIG. 3 illustrates an example of logical components that can be included in a system for analyzing samples. Analysis system 300 can be implemented using a single device. For example, the functionality of analysis system 300 can be implemented in a malware analysis module 112 incorporated into data appliance 102. Analysis system 300 can also be implemented, collectively, across multiple distinct devices. For example, the functionality of analysis system 300 can be provided by security platform 122.

In various embodiments, analysis system 300 makes use of lists, databases, or other collections of known safe content and/or known bad content (collectively shown in FIG. 3 as collection 314). Collection 314 can be obtained in a variety of ways, including via a subscription service (e.g., provided by a third party) and/or as a result of other processing (e.g., performed by data appliance 102 and/or security platform 122). Examples of information included in collection 314 are: URLs, domain names, and/or IP addresses of known malicious servers; URLs, domain names, and/or IP addresses of known safe servers; URLs, domain names, and/or IP addresses of known command and control (C&C) domains; signatures, hashes, and/or other identifiers of known malicious applications; signatures, hashes, and/or other identifiers of known safe applications; signatures, hashes, and/or other identifiers of known malicious files (e.g., Android exploit files); signatures, hashes, and/or other identifiers of known safe libraries; and signatures, hashes, and/or other identifiers of known malicious libraries.

A. Ingestion

In various embodiments, when a new sample is received for analysis (e.g., an existing signature associated with the sample is not present in analysis system 300), it is added to queue 302. As shown in FIG. 3, malicious file 130 is received by analysis system 300 and added to queue 302.

B. Static Analysis

Coordinator 304 monitors queue 302, and as resources (e.g., a static analysis worker) become available, coordinator 304 fetches a sample from queue 302 for processing (e.g., fetches a copy of malware 130). In particular, coordinator 304 first provides the sample to static analysis engine 306 for static analysis. In some embodiments, one or more static analysis engines are included within analysis system 300, where analysis system 300 is a single device. In other embodiments, static analysis is performed by a separate static analysis server that includes a plurality of workers (i.e., a plurality of instances of static analysis engine 306).

The static analysis engine (implementable via a set of scripts authored in an appropriate scripting language) obtains general information about the sample, and includes it (along with heuristic and other information, as applicable) in a static analysis report 308. The report can be created by the static analysis engine, or by coordinator 304 (or by another appropriate component) which can be configured to receive the information from static analysis engine 306. In some embodiments, the collected information is stored in a database record for the sample (e.g., in database 316), instead of or in addition to a separate static analysis report 308 being created (i.e., portions of the database record form the report 308). In some embodiments, the static analysis engine also forms a verdict with respect to the application (e.g., "safe," "suspicious," or "malicious"). As one example, the verdict can be "malicious" if even one "malicious" static feature is present in the application (e.g., the application includes a hard link to a known malicious domain). As another example, points can be assigned to each of the features (e.g., based on severity if found; based on how reliable the feature is for predicting malice; etc.) and a verdict can be assigned by static analysis engine 306 (or coordinator 304, if applicable) based on the number of points associated with the static analysis results.

C. Dynamic Analysis

Once static analysis is completed, coordinator 304 locates an available dynamic analysis engine 310 to perform dynamic analysis on the application. As with static analysis engine 306, analysis system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis worker manages a virtual machine instance. In some embodiments, results of static analysis (e.g., performed by static analysis engine 306), whether in report form (308) and/or as stored in database 316, or otherwise stored, are provided as input to dynamic analysis engine 310. For example, the static report information can be used to help select/customize the virtual machine instance used by dynamic analysis engine 310 (e.g., Microsoft Windows 7 SP 2 vs. Microsoft Windows 10 Enterprise, or iOS 11.0 vs. iOS 12.0). Where multiple virtual machine instances are executed at the same time, a single dynamic analysis engine can manage all of the instances, or multiple dynamic analysis engines can be used (e.g., with each managing its own virtual machine instance), as applicable. During the dynamic portion of the analysis, actions taken by the application (including network activity) are analyzed.

In various embodiments, static analysis of a sample is omitted or is performed by a separate entity, as applicable. As one example, traditional static and/or dynamic analysis may be performed on files by a first entity. Once it is determined (e.g., by the first entity) that a given file is suspicious or malicious, the file can be provided to a second entity (e.g., the operator of security platform 122) specifically for additional analysis with respect to the malware's use of network activity (e.g., by a dynamic analysis engine 310).

The environment used by analysis system 300 is instrumented/hooked such that behaviors observed while the application is executing are logged as they occur (e.g., using a customized kernel that supports hooking and log cat). Network traffic associated with the emulator is also captured (e.g., using pcap). The log/network data can be stored as a temporary file on analysis system 300, and can also be stored more permanently (e.g., using HDFS or another appropriate storage technology or combinations of technology, such as MongoDB). The dynamic analysis engine (or another appropriate component) can compare the connections made by the sample to lists of domains, IP addresses, etc. (314) and determine whether the sample has communicated (or attempted to communicate) with malicious entities.

As with the static analysis engine, the dynamic analysis engine stores the results of its analysis in database 316 in the record associated with the application being tested (and/or includes the results in report 312 as applicable). In some embodiments, the dynamic analysis engine also forms a verdict with respect to the application (e.g., "safe," "suspicious," or "malicious"). As one example, the verdict can be "malicious" if even one "malicious" action is taken by the application (e.g., an attempt to contact a known malicious domain is made, or an attempt to exfiltrate sensitive information is observed). As another example, points can be assigned to actions taken (e.g., based on severity if found; based on how reliable the action is for predicting malice; etc.) and a verdict can be assigned by dynamic analysis engine 310 (or coordinator 304, if applicable) based on the number of points associated with the dynamic analysis results. In some embodiments, a final verdict associated with the sample is made based on a combination of report 308 and report 312 (e.g., by coordinator 304).

V. Inline Ransomware Detection Via Server Message Block (SMB) Traffic

A. Introduction

Returning to the environment of FIG. 1, one type of attack that can be attempted against the resources of enterprise network 140 is a ransomware attack. As an example, the operator of system 120 could send a malicious file (e.g., 130) to a device on enterprise network 140 (e.g., client device 106) which, when executed, begins encrypting files on network shares (e.g., Microsoft Server Message Block (SMB) shares). Examples of ransomware attacks which take this or similar approaches include Avoslocker, Babuk, Blackmatter, Conti, Darkside, GandCrab, and Mountlocker. Such attacks generally progress as follows:

1. An SMB login occurs from the infected machine to a server. If credentials are required, they may be brute forced by the malicious application. Often, however, credentials are not required or are cached on the infected machine.
2. A ransomware note is created on the SMB share and a lock file is created, indicating that the SMB share has been infected. Examples of server log files corresponding to the ransomware note creation are shown in FIG. 4 (e.g., at 402-408).
3. A directory search is then performed, and for each located file (as illustrated in FIG. 5), the file is read (502), encrypted content is written back to the file (504), and the file is renamed (506), e.g., by appending random characters at the end of the file extension.
4. Subdirectories are traversed and their files are similarly overwritten with encrypted content (i.e., the subdirectory is entered and the first step above repeats).

Unfortunately, such attacks can be difficult to detect/prevent, particularly because SMB requests are common and it can be difficult to differentiate between benign and malicious requests. One approach is to detect (e.g., by endpoint software running on the SMB server) such behavior via a rule, for example, noticing that a threshold number of files has renamed within a short period of time. Unfortunately, by the time such a rule is triggered, significant damage may already have been done (e.g., hundreds of files may have been encrypted before detection occurs).

Using techniques described herein, data appliance 102, whether working individually or in cooperation (e.g., with security platform 122 in various embodiments), can detect and mitigate ransomware attacks, including by using inline traffic analysis, more efficiently than existing techniques. While the attacks and mitigations described herein are generally given in the context of SMB, such techniques can be adapted to protect other shared drive/storage protocols/technologies as well.

B. Ransom Note Modeling

One task performed by security platform 122 in various embodiments is ransom note modeling. In an example implementation, hundreds of collected ransom note samples (along with an appropriate number of benign samples) are used to train a model that can recognize ransom note content. Examples of features include two-gram words such as: "important files," "your files," "is encrypted," "been encrypted," "can recover," "to restore," and "bitcoin address." In an example implementation, eXtreme Gradient Boosting (XGBoost) is used for training, with a false positive rate of less than 0.025% and a false negative rate of 9%.

Models can be provided by security platform 122 to data appliance 102 (and stored, for example, within management plane 232) which can then apply the model to SMB traffic and detect when attempts are being made to write ransom notes to SMB shares (e.g., hosted by SMB server 154) by providing inline network traffic to the model. Updated models can be provided to data appliance 102 (along with other updates) as part of a subscription or other service. In some embodiments, instead of or in addition to using models, heuristic information/rules for identifying ransom notes are stored (e.g., within management plane 232).

C. Additional Detail on the Threat Engine

In various embodiments, data appliance 102 includes a threat engine 244. The threat engine incorporates both protocol decoding and threat signature matching during a respective decoder stage and pattern match stage. Results of the two stages are merged by a detector stage.

When data appliance 102 receives a packet, data appliance 102 performs a session match to determine to which session the packet belongs (allowing data appliance 102 to support concurrent sessions). Each session has a session state which implicates a particular protocol decoder (e.g., a web browsing decoder, an FTP decoder, or an SMTP decoder). When a file is transmitted as part of a session, the applicable protocol decoder can make use of an appropriate file-specific decoder (e.g., a PE file decoder, a JavaScript decoder, or a PDF decoder).

Figure 6:
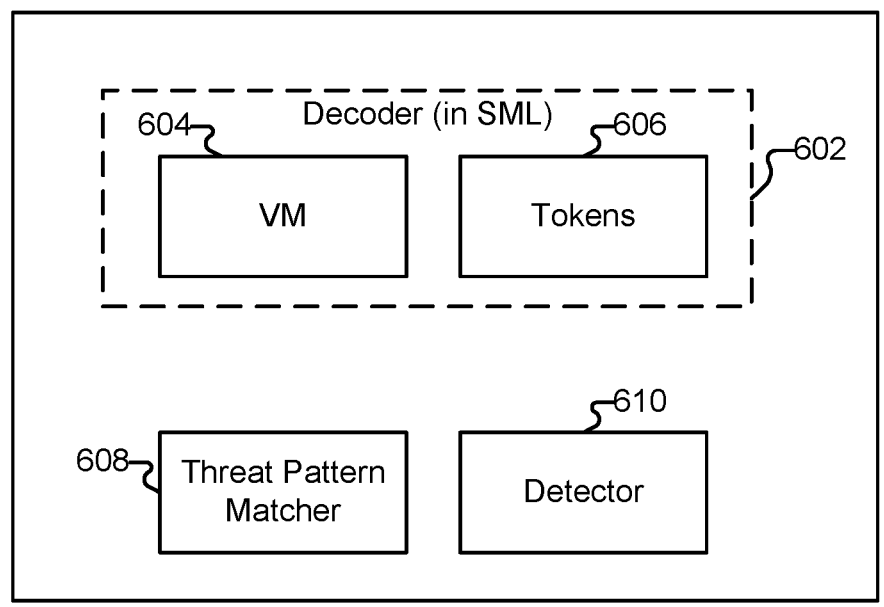
FIG. 6 illustrates portions of an embodiment of a threat engine.

Portions of an example embodiment of threat engine 244 are shown in FIG. 6. For a given session, decoder 602 walks the traffic bytestream, following the corresponding protocol and marking contexts. One example of a context is an end-of-file context (e.g., encountering </script> while processing a JavaScript file). Decoder 602 can mark the end-of-file context in the packet, which can then be used to trigger execution of the appropriate model using the file's observed features. In some cases (e.g., FTP traffic), explicit protocol-level tags may not be present for decoder 602 to identify/mark context with. In various embodiments, decoder 602 can use other information (e.g., file size as reported in a header) to determine when feature extraction of a file should end (e.g., the overlay section begins) and execution using an appropriate model should be commenced.

Decoder 602 comprises two parts. The first part of decoder 602 is a virtual machine portion (604) which can be implemented as a state machine using a state machine language. The second part of decoder 602 is a set of tokens 606 (e.g., deterministic finite automaton (DFA) or regular expressions) for triggering state machine transitions and actions when matched in traffic. Threat engine 244 also includes a threat pattern matcher 608 (e.g., using regular expressions) that performs pattern matching (e.g., against threat patterns). As one example, threat pattern matcher 608 can be provided (e.g., by security platform 122) with a table of strings (whether exact strings or wildcard strings) to match against, and corresponding actions to take in the event a string match is found. Detector 610 processes outputs provided by decoder 602 and threat pattern matcher 608 to take various actions.

D. Example Process

Figure 7:
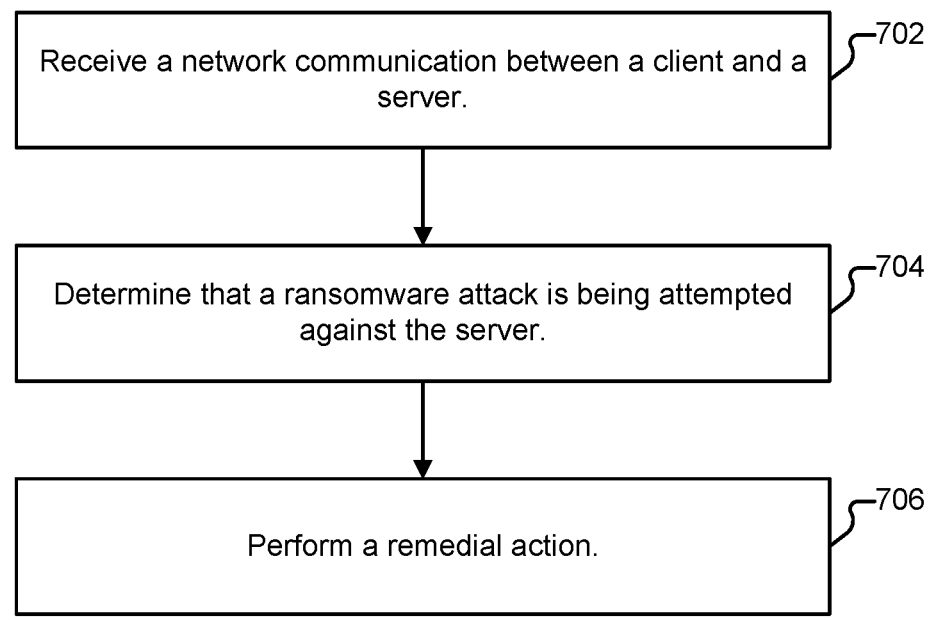
FIG. 7 illustrates an example of a process for detecting and mitigating a ransomware attack.

FIG. 7 illustrates an example of a process for detecting and mitigating a ransomware attack. In various embodiments, process 700 is performed by data appliance 102. The process can be implemented using a script (or set of scripts) authored in an example scripting language (e.g., python). Process 700 (or portions thereof, as applicable) can also be performed by other devices (e.g., security platform 122).

Process 700 begins at 702 when an indication is received by data appliance 102 of a network communication between a client and a server (e.g., as part of a session). As mentioned above, in various embodiments, data appliance 102 monitors communications between nodes within enterprise network 140 (as well as communications with external nodes). In an example scenario, suppose that device 106 has been compromised by ransomware. When client device 106 connects to SMB server 154, this is an example of portion 702 of process 700.

At 704, a determination is made that a ransomware attack is being attempted against the server. A variety of techniques can be used at 704 (whether individually or in combination). In particular, two general approaches are: (1) to identify that a ransomware note is attempting to be written (e.g., to the server) and/or (2) to identify that server files are being encrypted. As mentioned above, one approach to identifying ransomware notes is for data appliance 102 to make use of a model trained on ransomware notes (e.g., a model as trained and provided by security platform 122). Another approach is for data appliance 102 to make use of a set of heuristics/rules that can identify the creation/addition of a ransomware note to a server. Either/both approaches to detecting ransomware notes can efficiently be implemented using threat engine 244. As one example, a rule can be included that checks any file open/creation requests made in SMB traffic against the ransomware note model. As another example, a list of n-grams/tokens associated with ransomware notes can be provided to data appliance 102 for use by threat engine 244. As applicable, another component can also perform detection in the traffic (e.g., security platform 122).

One benefit of examining SMB traffic for an indication that a ransomware note is attempting to be created on a server is that such note creation is often the first step of an attack (i.e., it takes place before files are encrypted). If data appliance 102 is able to detect ransomware behavior quickly, it is possible for mitigation to occur, potentially before any files on the SMB server are corrupted. Examples of remedial actions that can be taken (706) include data appliance 102 preventing client device 106 from communicating with SMB server 154, isolating client device 106 from communicating with other nodes (e.g., client device 104), alerting an administrator, etc. Further, neither client device 106 nor SMB server 154 need to have endpoint protection applications installed, as the ransomware detection can be performed inline on traffic by data appliance 102.

In addition to checking for ransom note creation, data appliance 102 can also examine the traffic between client device 106 and SMB server 154 for other ransomware behaviors or indicators that a ransomware attack is being perpetrated, such as file encryption behavior. An example of a python script that can be used by embodiments of data appliance 102 to perform such detections is illustrated in FIG. 8. In some embodiments, e.g., where data appliance 102 is particularly resource constrained, portions of script 800 are executed by another system (e.g., security platform 122), which can form a verdict about the behavior (while still allowing data appliance 102 to take an immediate remedial action based on the verdict).

For many common types of files, the filetype is specified within a given file's header (e.g., as a magic number appearing in the first seven bytes of the file itself). Data appliance 102 can use filetype information and other information in detecting ransomware behavior in traffic. Further, file rename requests can be examined to see whether, e.g., the request is to append characters (e.g., changing .txt to .txt.kjsjh48w).

As mentioned above, a typical ransomware sequence is to read a file, write the file back (with encrypted contents), and change the extension. When a read request for a file occurs (e.g., as illustrated at 502 in FIG. 5), threat engine 244 determines the filetype and saves it in the session state. If the filetype changes during the write (504), this can be an indicator of ransomware encryption behavior. Other indicators data appliance 102 can monitor for are whether the file entropy significantly changes (e.g., from read to write), or whether the file contents match what is expected for the extension (e.g., during the write operation, and before the file is renamed). Data appliance 102 need not wait until the file is completely written—changes to filetype and entropy can be detected within the first portions of the file. Similarly, even ransomware that relies on partial encryption (e.g., encrypting one out of every "n" blocks instead of all blocks) can be detected using techniques described herein, as, for example, the entropy for those blocks during write will differ significantly from the read (or from other blocks). Other information, such as write offsets and write length patterns can also be used to detect partial encryption activity. Once ransomware behavior is observed, data appliance 102 can terminate the connection between client device 106 and SMB server 154, effectively blocking client device 106 from compromising files on SMB server 154.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
   receive, at a firewall appliance interposed between a client and a server, a server message block (SMB) network communication between the client and the server as part of a session between the client and the server;
   determine, at the firewall appliance, and using the received SMB network communication, an attempted creation of a ransom note associated with an attempted ransomware attack on the server by the client, wherein the determining includes detecting at least one of a file creation or file open request made by the client to the server and applying at least one of a trained model or a set of rules to identify the attempted creation on the server by the client of the ransom note; and
   in response to detecting the attempted ransomware attack, perform a remedial action, including by terminating, by the firewall appliance, the session between the client and the server; and
   a memory coupled to the processor and configured to provide the processor with instructions.

2. The system of claim 1, wherein the processor is further configured to detect a file encryption of a file on the server and initiated by the client.

3. The system of claim 1, wherein the model was trained on ransomware notes.

4. The system of claim 1, wherein the applying includes using a set of heuristics.

5. The system of claim 2, wherein detecting the file encryption includes detecting a file entropy change.

6. The system of claim 2, wherein the file encryption is a partial encryption.

7. The system of claim 1, wherein the applying includes forwarding, by the firewall appliance, at least a portion of the network communication to a remote device.

8. The system of claim 1, wherein performing the remedial action includes generating an alert.

9. A method, comprising:
   receiving, at a firewall appliance interposed between a client and a server, a server message block (SMB) network communication between the client and the server as part of a session between the client and the server;
   determining, at the firewall appliance, and using the received SMB network communication, an attempted creation of a ransom note associated with an attempted ransomware attack on the server by the client, wherein the determining includes detecting at least one of a file creation or file open request made by the client to the server and applying at least one of a trained model or a set of rules to identify the attempted creation on the server by the client of the ransom note; and
   in response to detecting the attempted ransomware attack, performing a remedial action, including by terminating, by the firewall appliance, the session between the client and the server.

10. The method of claim 9, further comprising detecting a file encryption of a file on the server and initiated by the client.

11. The method of claim 10, wherein detecting the file encryption includes detecting a file entropy change.

12. The method of claim 10, wherein the file encryption is a partial encryption.

13. The method of claim 10, wherein the model was trained on ransomware notes.

14. The method of claim 9, wherein the applying includes using a set of heuristics.

15. The method of claim 9, wherein the applying includes forwarding, by the firewall appliance, at least a portion of the network communication to a remote device.

16. The method of claim 9, wherein performing the remedial action includes generating an alert.

17. A computer program product embodied in a non-transitory computer readable medium and comprising computer instructions for:
- receiving, at a firewall appliance interposed between a client and a server, a server message block (SMB) network communication between the client and the server as part of a session between the client and the server;
- determining, at the firewall appliance, and using the received SMB network communication, an attempted creation of a ransom note associated with an attempted ransomware attack on the server by the client, wherein the determining includes detecting at least one of a file creation or file open request made by the client to the server and applying at least one of a trained model or a set of rules to identify the attempted creation on the server by the client of the ransom note; and
- in response to detecting the attempted ransomware attack, performing a remedial action, including by terminating, by the firewall appliance, the session between the client and the server.

\* \* \* \* \*